(12) United States Patent
Terui et al.

(10) Patent No.: US 12,741,697 B2
(45) Date of Patent: Sep. 22, 2026

(54) VEHICLE BODY LOWER STRUCTURE

(71) Applicant: Honda Motor Co., Ltd., Tokyo (JP)

(72) Inventors: Taiki Terui, Tokyo (JP); Shungo Chino, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 18/583,775

(22) Filed: Feb. 21, 2024

(65) Prior Publication Data

US 2024/0317320 A1 Sep. 26, 2024

(30) Foreign Application Priority Data

Mar. 21, 2023 (CN) ......................... 202310278851.1

(51) Int. Cl.
*B62D 25/20* (2006.01)

(52) U.S. Cl.
CPC .................................... *B62D 25/20* (2013.01)

(58) Field of Classification Search
CPC ............................ B62D 25/20; B62D 25/2036
See application file for complete search history.

(56) References Cited

U.S. PATENT DOCUMENTS

2017/0057555 A1 * 3/2017 Nakanishi .............. B62D 21/10

FOREIGN PATENT DOCUMENTS

CN 108407895 A * 8/2018 ......... B62D 25/2018
JP 2001010541 A * 1/2001
JP 2017030641 2/2017

OTHER PUBLICATIONS

CN 103619694 A (Year: 2014).*
JP 2015112898 A (Year: 2015).*

* cited by examiner

*Primary Examiner* — Lori Lyjak
(74) *Attorney, Agent, or Firm* — JCIPRNET

(57) ABSTRACT

A vehicle body lower structure includes: a floor; lower longitudinal beams; a floor cross beam, connected to the lower longitudinal beams on outer sides in a vehicle-width-direction of the floor; and the floor cross beam includes an upper portion member and an lower portion member, where the upper portion member and the lower portion member form a closed cross-section; and a floor tunnel, connected to a center of the floor cross beam in the vehicle-width-direction, where the lower portion member is connected to an opened cross-section of the floor tunnel at a center in the vehicle-width-direction, and when looking up from a bottom portion of the vehicle body, the lower portion member has a recessed portion recessed toward an upper side of the vehicle body, and the recessed portion has an widening portion that gradually expands outward in the vehicle-width-direction toward a rear side of a vehicle.

7 Claims, 7 Drawing Sheets

VEHICLE BODY LOWER STRUCTURE

CROSS-REFERENCE TO RELATED APPLICATION

This application claims the priority benefit of China application serial no. 202310278851.1, filed on Mar. 21, 2023. The entirety of the above-mentioned patent application is hereby incorporated by reference herein and made a part of this specification.

BACKGROUND

Technical Field

The disclosure relates to a vehicle body lower structure.

Description of Related Art

In recent years, efforts to provide access to sustainable transportation systems that also take into account vulnerable persons such as the elderly, and children among traffic participants have been active. In order to achieve the stated purpose, research and development efforts are made to further improve the safety and convenience of transportation through development related to the rigidity of the vehicle body. As the floor structure of the vehicle body, known to have the structure of the floor tunnel extending along the front and rear direction, the floor tunnel not only forms a configuration space for a structure extending along the front and rear direction of the vehicle body like a fuel pipe and an exhaust pipe, but also contributes to improving the rigidity of the floor. However, there is a case in which the cross-sectional shape of the floor tunnel does not allow sufficient rigidity to be obtained in relation to the load of the left and right sidewalls thereof in the left and right direction of opening and closing. As a result, there is a case in which the upward and downward vibration of the floor to the left and right of the floor tunnel is unable to be sufficiently suppressed, or in which there is a disadvantage in terms of load dispersion in case of side collision.

As a countermeasure to this, Patent Document 1 (Japanese Patent Application Laid-Open No. 2017-30641) discloses an vehicle body lower structure in which the rigidity of the floor is ensured and the increase in the number of components and the weight of the vehicle body is suppressed by connecting the rear end of the floor tunnel to the floor cross beam and sealing the opening of the floor tunnel with the vertical wall of the floor cross beam. However, in the case of All-Wheel Drive (AWD) vehicles and Electric Vehicles (EV), the openings at the rear end of the floor tunnel is unable to be closed by the vertical wall of the floor cross beam because the drive components and pipes are located in the openings of the floor tunnel. In addition, if reinforcing members such as stays are used to ensure the rigidity of the floor, it is conceivable that the number of components and the weight of the vehicle body will increase.

SUMMARY

The disclosure provides a vehicle body lower structure that has good rigidity and is capable of suppressing the deformation of the floor.

The disclosure provides a vehicle body lower structure including: a floor; lower longitudinal beams; a floor cross beam, connected to the lower longitudinal beams on outer sides in a vehicle-width-direction of the floor; and the floor cross beam includes an upper portion member and an lower portion member, where the upper portion member and the lower portion member form a closed cross-section; and a floor tunnel, connected to a center of the floor cross beam in the vehicle-width-direction, where the lower portion member is connected to an opened cross-section of the floor tunnel at a center in the vehicle-width-direction, and when looking up from a bottom portion of the vehicle body, the lower portion member has a recessed portion recessed toward an upper side of the vehicle body, and the recessed portion has an widening portion that gradually expands outward in the vehicle-width-direction toward a rear side of a vehicle.

Based on the above, in the vehicle body lower structure in the embodiment of the disclosure, by providing an widening portion expending toward the outer side in the vehicle-width-direction on the opened cross-section of the recessed portion of the floor cross beam that is continuous with the floor tunnel, in the event of a side collision, the input load may be dispersed and transferred to the floor tunnel and the floor cross beam, thereby improving the rigidity of the floor and the floor cross beam and further suppressing the deformation near the floor tunnel.

In order to make the above-mentioned features and advantages of the disclosure comprehensible, embodiments accompanied with drawings are described in detail below.

DESCRIPTION OF THE EMBODIMENTS

In one embodiment of the disclosure, the lower portion member includes a lower wall forming a lower portion of the closed cross-section and a rear wall forming a rear portion of the closed cross-section, the rear wall has a tilting portion that gradually tilts forward toward the lower wall, and the tilting portion extends along the vehicle-width-direction across the recessed portion.

In one embodiment of the disclosure, the tilting portion includes a central tilting portion and a side tilting portion, the central tilting portion is offset upward along the widening portion, and the side tilting portion extends from the central tilting portion to the lower longitudinal beams, and a size of the central tilting portion in a vehicle-height-direction is smaller than a size of the side tilting portion in the vehicle-height-direction.

In one embodiment of the disclosure, the upper portion member includes a front wall forming a front portion of the closed cross-section and an upper wall forming an upper portion of the closed cross-section, and the front wall and the upper wall are connected above the floor tunnel and form a stepped portion entirely bent upward while extending from two ends toward a center and extending along the vehicle-width-direction.

In one embodiment of the disclosure, the front wall has a ridge line extending from an end portion on the outer side in the vehicle-width-direction toward the floor tunnel at a higher portion of the floor tunnel.

In one embodiment of the disclosure, the stepped portion has a top portion at a center in the vehicle-width-direction in which the floor cross beam and the floor tunnel are connected, and the top portion has a maximum height from a front panel portion of the floor, and when viewed from a front direction, the top portion and the widening portion are aligned in the vehicle-height-direction.

In one embodiment of the disclosure, the rear wall of the lower portion member extends upward from the closed cross-section and is joined with a front edge of a rear panel portion of the floor, and an upper edge of the rear wall is provided with a bending portion bent downward toward the lower longitudinal beams on the outer sides in the vehicle-width-direction of the top portion.

Figure 1:
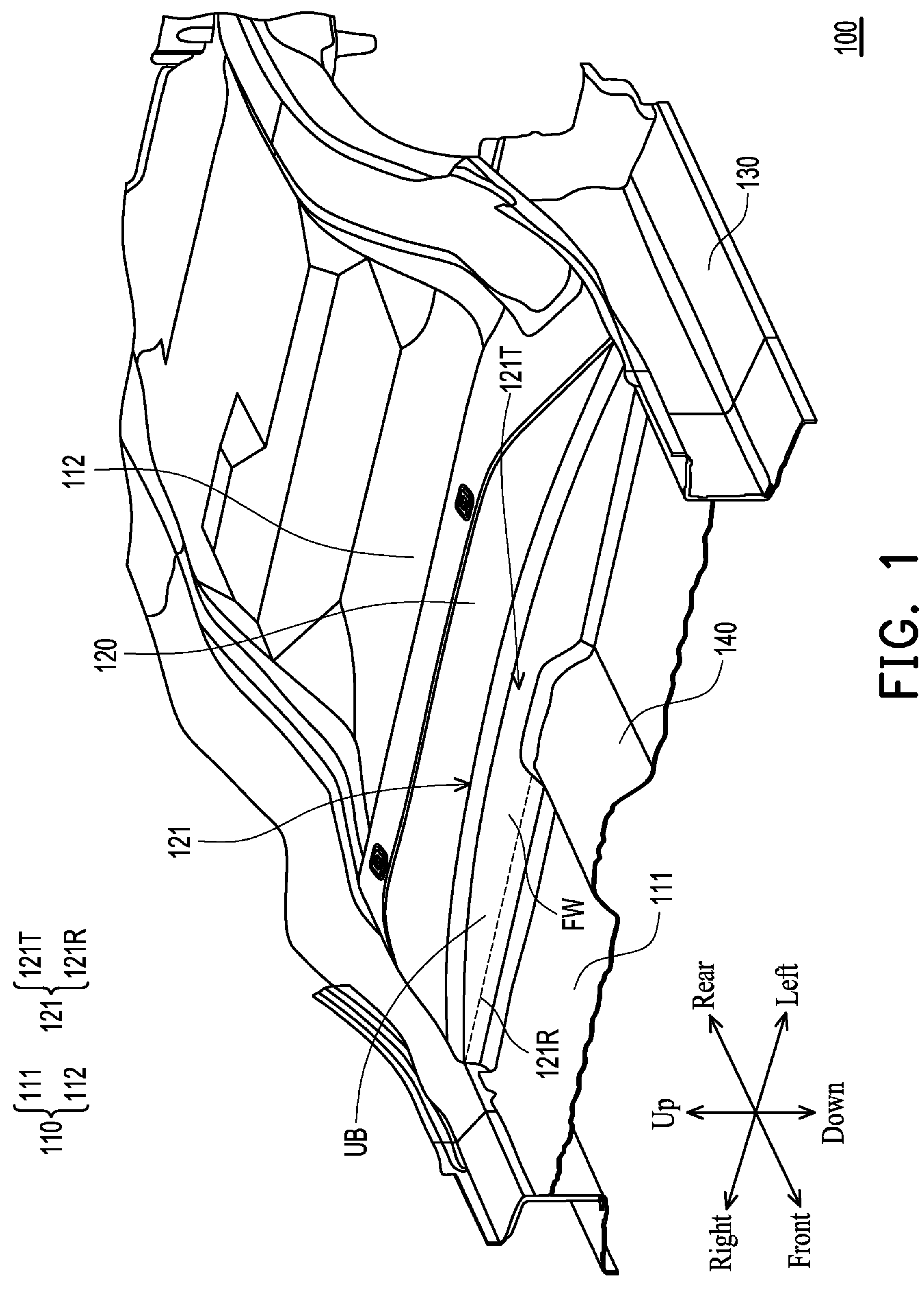
FIG. 1 is a three-dimensional schematic view of the vehicle body lower structure according to one embodiment of the disclosure.
Figure 2:
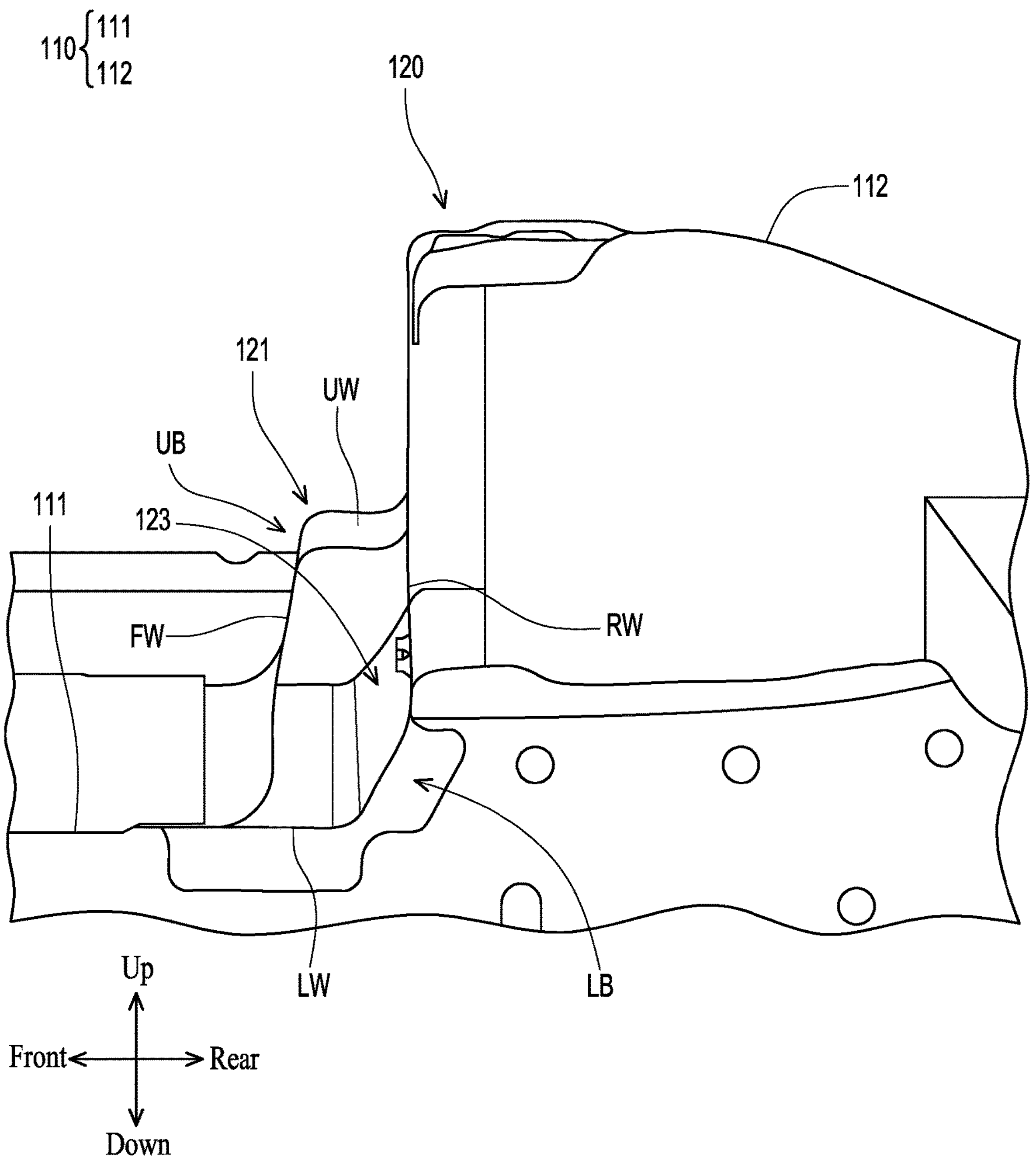
FIG. 2 is a cross-sectional schematic side view of the vehicle body lower structure in FIG. 1.
Figures 3A, 3B:
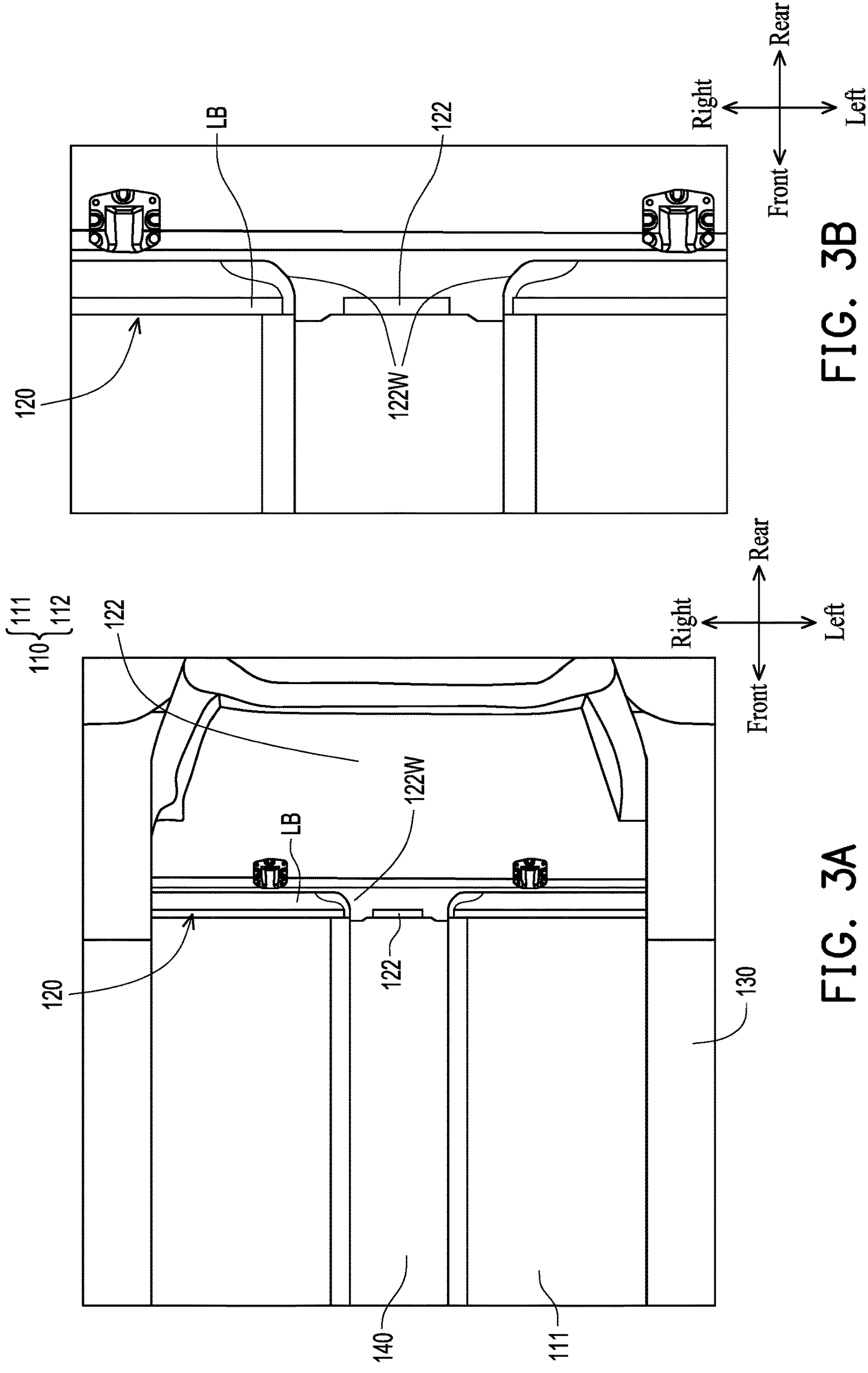
FIG. 3A is a bottom schematic view of the vehicle body lower structure in FIG. 1.
FIG. 3B is an enlarged schematic view of the widening portion in FIG. 3A.
Figure 4:
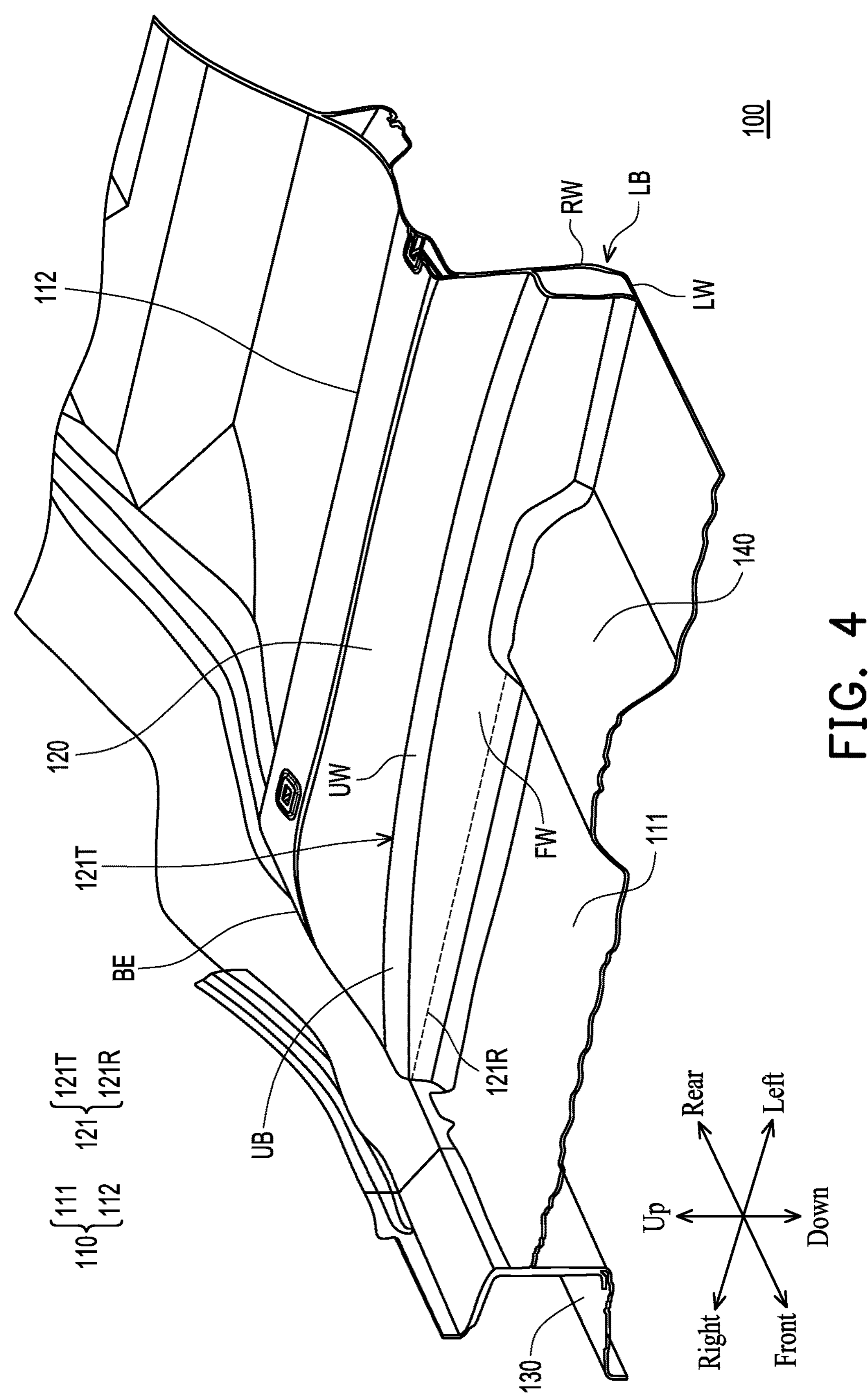
FIG. 4 is a cross-sectional schematic view of the vehicle body lower structure in FIG. 1 from the viewing angle of FIG. 1.
Figure 5:
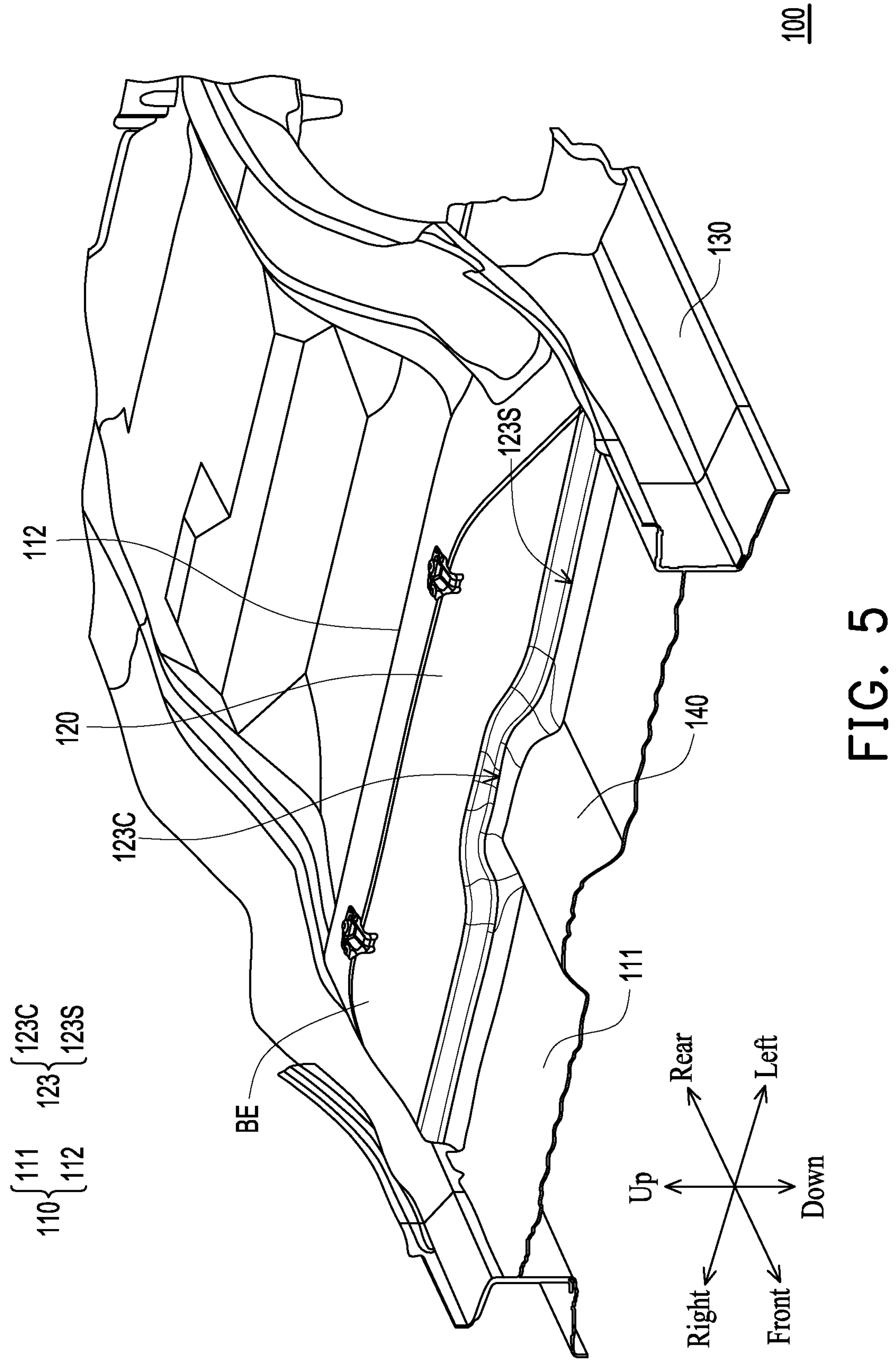
FIG. 5 is a three-dimensional schematic view of the vehicle body lower structure in FIG. 1 with the rear panel portion removed.
Figure 6A:
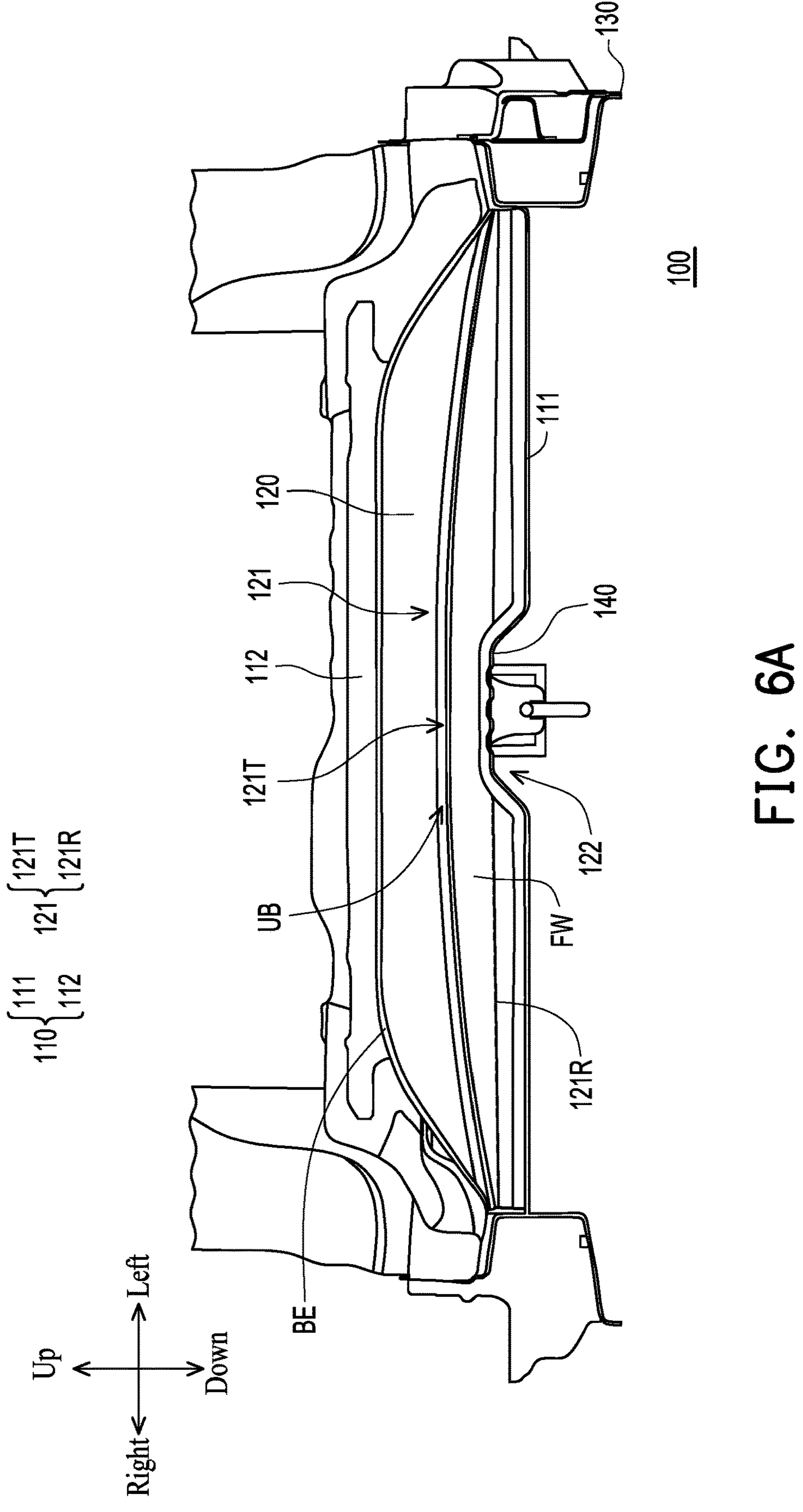
FIG. 6A is a front schematic view of the vehicle body lower structure in FIG. 1.
Figure 6B:
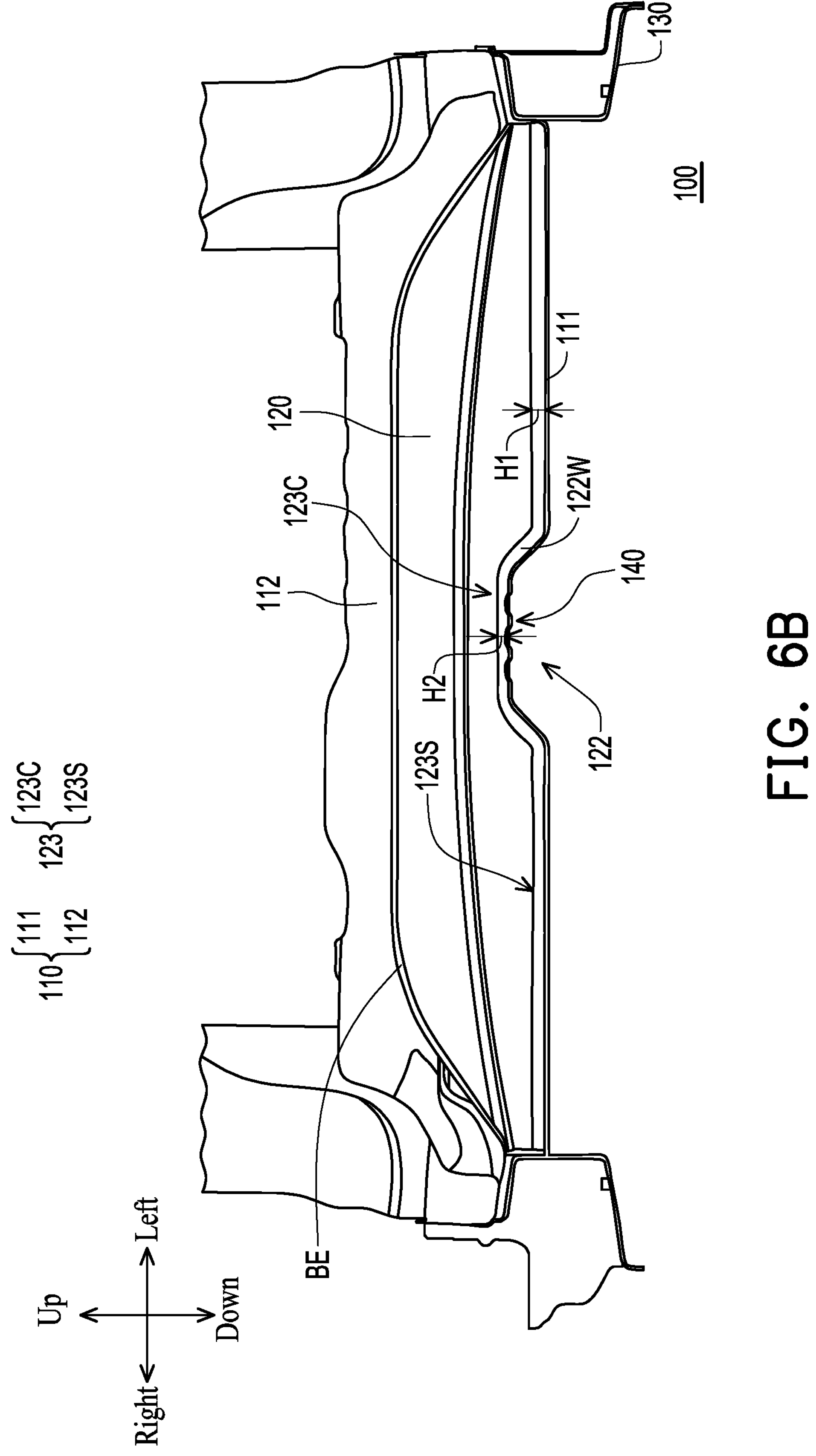
FIG. 6B is a rear schematic view of the vehicle body lower structure in FIG. 1.

FIG. 1 is a three-dimensional schematic view of the vehicle body lower structure according to one embodiment of the disclosure. FIG. 2 is a cross-sectional schematic side view of the vehicle body lower structure in FIG. 1. FIG. 3A is a bottom schematic view of the vehicle body lower structure in FIG. 1. FIG. 3B is an enlarged schematic view of the widening portion in FIG. 3A. FIG. 4 is a cross-sectional schematic view of the vehicle body lower structure in FIG. 1 from the viewing angle of FIG. 1. FIG. 5 is a three-dimensional schematic view of the vehicle body lower structure in FIG. 1 with the rear panel portion removed. FIG. 6A is a front schematic view of the vehicle body lower structure in FIG. 1. FIG. 6B is a rear schematic view of the vehicle body lower structure in FIG. 1. It should be noted that, for convenience, the front and rear direction, the left and right direction, and the up and down direction of a vehicle are defined as shown in the figures, and the composition of each portion is described according to this definition. The front and rear direction, the left and right direction, and the up and down direction are equivalent to the vehicle-length-direction, the vehicle-width-direction, and the vehicle-height-direction, respectively.

Specifically, in this embodiment, the vehicle body of the vehicle is made of high-strength metal plates such as steel plates and aluminum alloy plates. Moreover, in this embodiment, the vehicle body lower structure 100 refers to the structure provided near the floor cross beam 120 and the floor tunnel 140.

Referring to FIG. 1 to FIG. 6B, in this embodiment, the vehicle body lower structure 100 includes a floor 110, a floor cross beam 120, a pair of left and right lower longitudinal beams 130, and a floor tunnel 140. The floor 110 includes relatively thin metal plates such as steel plates and aluminum alloy plates, and is provided between the lower longitudinal beams 130 and the floor tunnel 140 and behind the floor cross beam 120. The floor cross beam 120 is provided along the vehicle-width-direction and is orthogonal to the floor tunnel 140, and is connected to the lower longitudinal beams 130 on the outer side in the vehicle-width-direction of the floor 110. The lower longitudinal beams 130 are connected to two end portions of the floor cross beam 120 and extends along the vehicle-length-direction. The floor tunnel 140 is connected to a center of the floor cross beam 120 in the vehicle-width-direction, extended along the vehicle-length-direction at the center portion of the floor 110, and the vehicle body is formed into a substantially left-right symmetrical shape with the floor tunnel 140 as the center. In this embodiment, the floor tunnel 140 not only forms a configuration space for a structure extending along the vehicle-length-direction like a fuel pipe and an exhaust pipe, but also contributes to improving the rigidity of the floor 110.

Furthermore, as shown in FIG. 2, in this embodiment, the floor cross beam 120 includes an upper portion member UB and a lower portion member LB, and the upper portion member UB and the lower portion member LB form a closed cross-section. More specifically, the upper portion member UB includes a front wall FW forming a front portion of the closed cross-section and an upper wall UW forming an upper portion of the closed cross-section, and the lower portion member LB includes a rear wall RW forming a rear portion of the closed cross-section and a lower wall LW forming a lower side of the closed cross-section.

As shown in FIG. 3A and FIG. 3B, in this embodiment, the lower portion member LB is connected to an opened cross-section of the floor tunnel 140 at a center in the vehicle-width-direction, and when looking up from a bottom portion of the vehicle body, the lower portion member LB has a recessed portion 122 recessed toward an upper side of the vehicle body, and the recessed portion 122 has an widening portion 122W that gradually expands outward in the vehicle-width-direction toward a rear side of the vehicle.

In this way, by providing the widening portion 122W, the floor cross beam 120 connected to the floor tunnel 140 has a wider width than the floor tunnel 140 at the recessed portion 122 that is continuous with the opened cross-section of the floor tunnel 140, and the widening portion 122W also softens the shape of the recessed portion 122 in relation to the connection with the floor tunnel 140. This allows the load in the event of a side collision to be smoothly transferred to the other side. In this way, in the event of a side collision, the input load may be dispersed and transferred to the floor tunnel 140 and the floor cross beam 120, thereby improving the rigidity of the floor 110 and the floor cross beam 120 and further suppressing the deformation of the recessed portion 122 and the floor tunnel 140.

As shown in FIG. 2, FIG. 4, FIG. 5, and FIG. 6B, in this embodiment, the rear wall RW has a tilting portion 123 that gradually tilts forward toward the lower wall LW, and the tilting portion 123 extends along the vehicle-width-direction across the recessed portion 122. Specifically, as shown in FIG. 5, the tilting portion 123 includes a central tilting portion 123C and a side tilting portion 123S, the central tilting portion 123C is offset upward along the widening portion 122W, and the side tilting portion 123S extends from the central tilting portion 123C to the lower longitudinal beams 130, and as shown in FIG. 6B, a size H2 of the central tilting portion 123C in a vehicle-height-direction is smaller than a size H1 of the side tilting portion 123S in the vehicle-height-direction.

In this way, by forming the tilting portion 123 on the rear wall RW of the lower portion member LB, the cross-section of the floor cross beam 120 may be reduced to reduce weight, and the tilting portion 123 may be used to increase the ridge line, reinforcing ribs are thus formed to improve the rigidity of the floor cross beam 120. Furthermore, by setting the size of the central tilting portion 123C offset along the widening portion 122W in the vehicle-height-direction to be smaller than the size of the side tilting portion 123S in the vehicle-height-direction, the offset amount formed in the vehicle-height-direction may be made smaller, and at the same time, the line of the offset inflection points, which depends on the shape of the widening portion 122W, may be set longer in the vehicle-width-direction, and thus the load in the event of a side collision may be transferred to the other side smoothly, thereby suppressing the deformation of the offset central tilting portion 123C.

As shown in FIG. 1, FIG. 2, FIG. 4, FIG. 6A and FIG. 6B, in this embodiment, the front wall FW and the upper wall UW of the upper portion member UB are connected above the floor tunnel 140 and form a stepped portion 121 entirely bent upward while extending from two ends toward a center and extending along the vehicle-width-direction. Furthermore, as shown in FIG. 1 and FIG. 2, in this embodiment, the floor cross beam 120 is provided between a front panel portion 111 and a rear panel portion 112 of the floor 110, where the rear panel portion 112 is formed above the front panel portion 111, the floor cross beam 120 has a stepped portion 121 between the front panel portion 111 and the rear panel portion 112. Moreover, as shown in FIG. 1 and FIG. 6A, in this embodiment, the stepped portion 121 is entirely bent upward while extending from two ends toward the center. In this way, by forming the stepped portion 121 above the floor tunnel 140 that entirely bending upward while extending from two ends toward the center, in the event of a side collision, the load may be transferred to the other side through the bending of the stepped portion 121, and the rigidity of the floor cross beam 120 may be improved. Moreover, the stepped portion 121 is entirely bent upward while extending from two ends toward the center, so that the stepped portion 121 does not form an inflection point where the shape changes drastically, in addition, the deformation at an inflection point with a large shape change, such as the floor tunnel 140, may also transfer the load through the bending portion of the stepped portion 121 to share the load. In addition, the degree of upward curvature of the entire stepped portion 121 while extending from two ends toward the center may be increased by increasing the area of the front wall FW, thereby suppressing the curvature in the vehicle-height-direction.

Further, as shown in FIG. 1 and FIG. 4, the front wall FW of the upper portion member UB forming the stepped portion 121 has a ridge line 121R extending from an end portion on an outer side in the vehicle-width-direction toward the floor tunnel 140 at a higher portion of the floor tunnel 140. In this way, by providing the ridge line 121R in the front wall FW of the upper portion member UB forming the stepped portion 121, the load input from the lateral side may be efficiently transferred to the floor tunnel 140, and thereby improving the rigidity of the floor cross beam 120. Thus, the cross-section of the floor cross beam 120 may be set smaller while still suppressing deformation.

As shown in FIG. 4 and FIG. 6A, in this embodiment, the stepped portion 121 has a top portion 121T at a center in the vehicle-width-direction connecting the floor cross beam 120 and the floor tunnel 140, and the top portion 121T has a maximum height from a front panel portion 111 of the floor 110, and when viewed from a front direction, the top portion 121T and the widening portion 122W are aligned in the vehicle-height-direction. In this way, by aligning the top portion 121T and the widening portion 122W of the stepped portion 121 in the vehicle-height-direction, it may be ensured that the stepped portion 121 is at the highest bend in the upper portion of the floor tunnel 140, which ensures a cross-sectional area at the connection position between the floor cross beam 120 and the floor tunnel 140, thereby suppressing deformation.

On the other hand, as shown in FIG. 5 and FIG. 6A, in this embodiment, the rear wall RW of the lower portion member LB of the floor cross beam 120 extends upward from the closed cross-section and is joined with a front edge of the rear panel portion 112 of the floor 110, and a bending portion BE extending toward the lower longitudinal beams 130 and bent downward toward the lower longitudinal beams 130 is provided at an end portion of the upper edge of the rear wall RW on the outer side in the vehicle-width-direction of the top portion 121T of the stepped portion 121. In this way, since the bending portion BE is provided between the upper edge of the rear wall RW and the end portion of the floor cross beam 120, and the bending portion BE is located outside the top portion 121T of the stepped portion 121, when a collision load is input from the lateral side, the stress concentrated at the bending portion BE may be effectively dispersed through the stepped portion 121, thereby suppressing the deformation of the floor cross beam 120.

To sum up, in the vehicle body lower structure in the embodiment of the disclosure, by providing an widening portion expending toward the outer side in the vehicle-width-direction on the opened cross-section of the recessed portion of the floor cross beam that is continuous with the floor tunnel, in the event of a side collision, the input load may be dispersed and transferred to the floor tunnel and the floor cross beam, thereby improving the rigidity of the floor and the floor cross beam and further suppressing the deformation near the floor tunnel.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. A vehicle body lower structure, comprising:

a floor;

lower longitudinal beams;

a floor cross beam, connected to the lower longitudinal beams on outer sides in a vehicle-width-direction of the floor; and the floor cross beam comprises an upper portion member and a lower portion member, wherein the upper portion member and the lower portion member form a closed cross-section; and a floor tunnel, connected to a center of the floor cross beam in the vehicle-width-direction, wherein the lower portion member is connected to an opened cross-section of the floor tunnel at a center in the vehicle-width-direction, and when looking up from a bottom portion of the vehicle body, the lower portion member has a recessed portion recessed toward an upper side of the vehicle body, and the recessed portion has a widening portion that gradually expands outward in the vehicle-width-direction toward a rear side of a vehicle.

2. The vehicle body lower structure according to claim 1, wherein the lower portion member comprises a lower wall forming a lower portion of the closed cross-section and a rear wall forming a rear portion of the closed cross-section, the rear wall has a tilting portion that gradually tilts forward toward the lower wall, and the tilting portion extends along the vehicle-width-direction across the recessed portion.

3. The vehicle body lower structure according to claim 2, wherein the tilting portion comprises a central tilting portion and a side tilting portion, the central tilting portion is offset upward along the widening portion, and the side tilting portion extends from the central tilting portion to the lower longitudinal beams, and a size of the central tilting portion in a vehicle-height-direction is smaller than a size of the side tilting portion in the vehicle-height-direction.

4. The vehicle body lower structure according to claim 1, wherein the upper portion member comprises a front wall forming a front portion of the closed cross-section and an upper wall forming an upper portion of the closed cross-section, and the front wall and the upper wall are connected above the floor tunnel and form a stepped portion entirely bent upward while extending from two ends toward a center and extending along the vehicle-width-direction.

5. The vehicle body lower structure according to claim 4, wherein the front wall has a ridge line extending from an end portion on the outer side in the vehicle-width-direction toward the floor tunnel at a higher portion of the floor tunnel.

6. The vehicle body lower structure according to claim 4, wherein the stepped portion has a top portion at a center in the vehicle-width-direction in which the floor cross beam and the floor tunnel are connected, and the top portion has a maximum height from a front panel portion of the floor, and when viewed from a front direction, the top portion and the widening portion are aligned in vehicle-height-direction.

7. The vehicle body lower structure according to claim 6, wherein a rear wall of the lower portion member extends upward from the closed cross-section and is joined with a front edge of a rear panel portion of the floor, and an upper edge of the rear wall is provided with a bending portion bent downward toward the lower longitudinal beams on the outer sides in the vehicle-width-direction of the top portion.

* * * * *